Feb. 24, 1942.   T. CARRIGAN   2,274,126
WEIGHT REMOVING PLIERS
Filed July 1, 1941
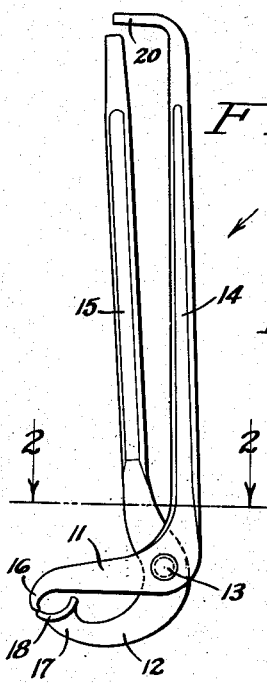
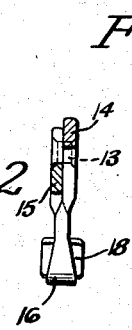
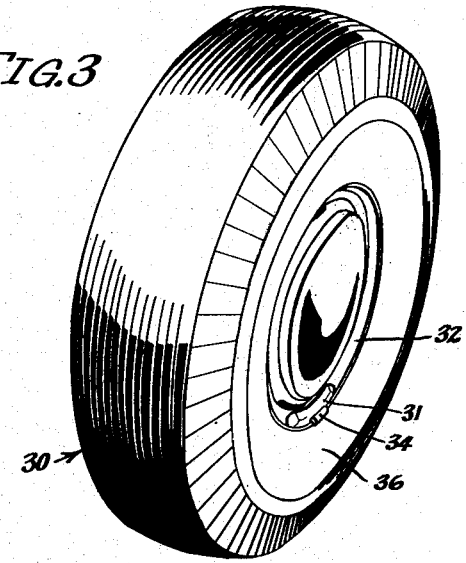
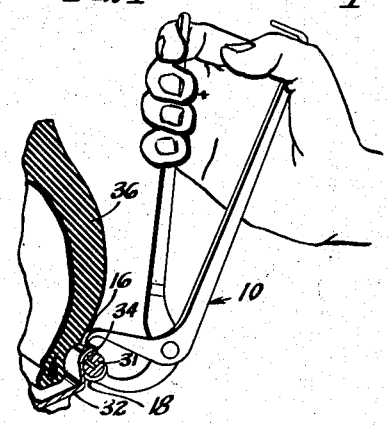
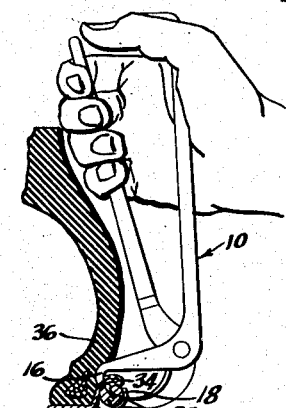
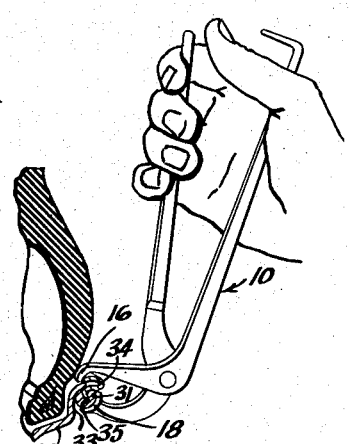
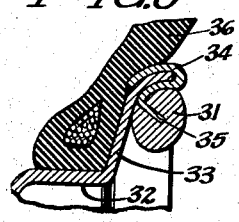
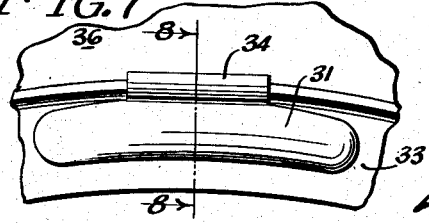
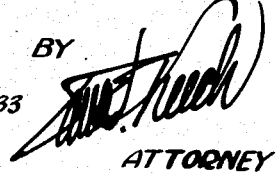
INVENTOR:
TRACY CARRIGAN
BY
ATTORNEY Patented Feb. 24, 1942

2,274,126

UNITED STATES PATENT OFFICE 2,274,126

WEIGHT REMOVING PLIERS

Tracy Carrigan, Lansing, Mich., assignor to Food Machinery Corporation, San Jose, Calif., a corporation of Delaware Application July 1, 1941, Serial No. 400,639

3 Claims. (Cl. 254—131)

This invention relates to equipment having to do with the application and removal of balance weights to automobile wheels, and particularly to a pair of pliers for removing such weights.

In order that automobile wheels may operate smoothly at high speeds it has been found advantageous to trim the balance of these wheels by fastening weights on the rim in a sector of the wheel which is light. Each of these weights is ordinarily secured in place by a clip which extends over a flange of the rim of the wheel between this flange and the tire. In retrimming a wheel it is necessary to remove the one or more balance weights secured thereto, either to re-position these or to replace a weight of a given size with a smaller or larger weight to bring the wheel into balance.

Hitherto no means has been provided for easily and quickly removing these balance weights, and it is an object of the present invention to provide such a means.

The clips with which these balance weights are applied to the rims of automobile wheels are generally made of spring material, and in order for these to hold the weight firmly on the wheel, must practically retain the shape with which they are originally manufactured. The crude methods hitherto used for removing these weights in retrimming the balance of a wheel has frequently resulted in damaging these spring clips so as to render the weight equipped therewith useless for re-application to the wheel.

It is therefore another object of the invention to provide a means for readily removing such a balance weight from an automobile wheel which will not damage the spring clip with which this weight is attached to the wheel, and will leave the weight and clip in serviceable condition for re-use.

The manner of accomplishing the foregoing objects, as well as further objects and advantages, will be made manifest in the following description taken in connection with the accompanying drawing in which:

Fig. 1 is an elevational view of a pair of pliers which constitutes a preferred embodiment of the invention.

Fig. 2 is a cross sectional view taken on the line 2—2 of Fig. 1.

Fig. 3 is a perspective view of an automobile wheel, the balance of which has been trimmed by the addition of a balance weight thereto.

Fig. 4 is an operational view illustrating the first position of the pliers shown in Fig. 1 when using these to remove a balance weight from said wheel.

Fig. 5 is a view similar to Fig. 4 illustrating the next position of the said pliers in the removal of said balance weight.

Fig. 6 is a view similar to Fig. 5 and illustrates the final position of said pliers in removing said balance weight.

Fig. 7 is an enlarged elevational view of a portion of the aforesaid wheel, illustrating one of said balance weights attached to the rim of said wheel.

Fig. 8 is a cross sectional view taken on the line 8—8 of Fig. 7.

Referring specifically to the drawing, pliers 10 are seen to include a pair of jaws 11 and 12 which are pivoted together by pin 13, and on the other side of said pivot pin are provided respectively with handles 14 and 15. As shown in Fig. 1 the jaw 11 extends from the pivot pin 13 substantially at a right angle with its handle 14. The jaws 11 and 12 as shown in Fig. 2 have a flattened cross section, the jaw 11 being narrowed towards its tip in the plane of its greatest cross sectional dimension and widened transversely to produce a claw 16, which turns sharply downwardly. The jaw 12 extends downwardly from the pivot pin 13 below the jaw 11 and curves so that the end portion 17 of this jaw lies just inside of the claw 16. Provided on the end portion 17 of the jaw 12 is a semi-cylindrical bearing plate 18, which is so located with respect to the jaw 11 that when the handles 14 and 15 are brought together, as shown in Fig. 1, the claw 16 just comes into contact with the outermost edge of the plate 18.

On the upper end of the handle 14 is a pry finger 20, which is bent substantially at right angles from the handle 14, and is adaptable for use in the manner to be described hereinafter.

To illustrate the manner of using balance weights, which the pliers 10 are provided for removing from automobile wheels, such a wheel 30 is shown in Fig. 3, with a balance weight 31 secured upon a tire rim 32 of this wheel.

The balance weight 31 comprises a body of lead which is preferably shaped to conform to the concave outer surface of a tire flange 33, of the rim 32. The weight 31 has a spring clip 34 which is attached to the weight by having a tongue 35 of this clip anchored in the weight at the time the latter is cast. The spring clip 34, as shown in Fig. 8, is shaped and tempered so as to resiliently receive the wheel rim flange 33 when pushed into place over this flange. The clip is thus caused to snugly hold the weight 31 against the flange 33.

When the weight 31 is thus mounted in place on the wheel 30, the spring clip 34 extends inwardly between the flange 33 and the tire 36 of the wheel 30. For the latter reason it has heretofore been fairly difficult to remove balance weights of this type from a wheel, the tire of which is inflated, without springing the clip 34 in the process of removing the weight. As stated, the tongs 10 are provided for the purpose of removing weights of this type without damaging the attaching clip, this being accomplished in the following manner:

The first step is to apply the pliers 10 as shown in Fig. 4, with the plate 18 against the bottom surface of the balance weight 31, and with the claw 16 nosing inwardly into the space between the tire 36 and the clip 34. When the pliers are thus positioned the operator applies pressure on the handles 14 and 15 to grasp the weight 31 between the jaws of the pliers so as to prevent the plate 18 from slipping off of the weight, and then rotates the pliers inwardly toward the tire 36 until the point of the claw 16 slides inwardly over the end of the clip 34, as shown in Fig. 5. This permits the claw to drop downwardly over the inner edge of the clip 34 and the handles 14 and 15 to come somewhat closer together. Still maintaining his grasp on these handles, as shown in Fig. 5, the operator rotates the pliers in a reverse direction, as shown in Fig. 6, this action rotating the tire weight 31 and clip 34 approximately about the center of the weight. This removes the clip 34 from over the rim flange 33 without unduly spreading the clip. The clip is thus not damaged in any way when removed by the pliers 10, but is still in serviceable condition and available for re-use.

From the foregoing it is believed clear that the pliers 10 provide a means for accomplishing the objects I have stated, and by which balance weights may be removed from automobile wheels without damaging the weights or the spring clips provided thereon, thus salvaging these weights in good condition so that they may be re-used.

The pry finger 20 is adapted for use in removing clips 34 under certain exceptional conditions where these clips may not be removed completely from the rim of the wheel in the manner above described. For instance, when weights are put on the inside flange of a wheel which has a large brake drum coming very close to the inner rim, then the weight removing pliers of my invention, when operated as above described will pull the weight only part way off as there is not room enough to swing the pliers through a large enough arc to completely remove the clip. In this case when a weight has been partially removed in the conventional manner hereinabove described, then the pry finger 20 can easily be inserted in the clip to complete the operation of pulling the weight off.

Claims:

1. In a pair of pliers adapted for removing a balance weight from an automobile wheel rim having a tire thereon, said rim having a curved inner surface, said weight comprising a metallic body which is oval or circular in cross section with an arcuate clip substantially conforming to the curved surface of said weight, the combination of: a pair of jaws; a pin pivotally uniting said jaws; a pair of handles provided on said jaws for the purpose of manipulating the latter; a claw provided on the end of one of said jaws, said claw being turned toward the other of said jaws; an arcuate balance weight engaging plate provided on said other jaw, said plate being shifted toward said claw when said handles are brought toward each other, the tip of said claw being turned sharply toward said plate so that when said plate is placed against said weight and said claw inserted between the tire and said clip and said plier handles gripped together and rotated inwardly, the tip of said claw will be permitted to drop downwardly over the inner edge of said spring clip thus facilitating the removal of said weight by the reverse rotation of said pliers without the distortion of said spring clip.

2. In a pair of pliers adapted for removing a balance weight from an automobile wheel rim having a tire therein, said rim having a curved inner surface, said weight comprising a metallic body which is oval or circular in cross section with an arcuate clip substantially conforming to the curved surface of said weight, the combination of: a pair of jaws; a pin pivotally uniting said jaws; a pair of handles provided on said jaws for the purpose of manipulating the latter, one of said jaws being disposed substantially at right angles relative to its handle; a claw provided on the end of the last mentioned jaw, said claw being turned toward the other of said jaws; an arcuate weight engaging plate provided on said other jaw, said plate and said jaw being brought relatively close together when said handles are shifted toward each other, the tip of said claw being turned sharply toward said plate so that when said plate is placed against said weight and said claw inserted between the tire and said clip and said plier handles gripped together and rotated inwardly, the tip of said claw will be permitted to drop downwardly over the inner edge of said spring clip thus facilitating the removal of said weight by the reverse rotation of said pliers without the distortion of said spring clip.

3. In an instrument adapted for removing a balance weight from an automobile wheel rim having a tire thereon, said rim having a curved inner surface, said weight comprising a metallic body which is oval or circular in cross section with an arcuate clip substantially conforming to the curved surface of said rim, the combination of: a jaw having an arcuate recess adapted to rest against and conform to said metallic body; a claw adapted to be slipped inwardly between said tire and said clip to permit said claw to operatively engage said clip; and handle means to unite said jaw and said claw whereby said claw may be inserted inwardly as aforesaid by rotation of said jaw said claw and said handle means about the axis of said metallic body with the engaging surfaces of said body and said jaw forming a bearing for said rotation, said jaw also cooperating with said claw when the latter is in operative relation with said clip so that a reverse rotation of said handle means causes the rotation of said balance weight relative to said rim and the removal of said clip from over said rim.

TRACY CARRIGAN.